United States Patent
Lee et al.

(10) Patent No.: US 7,222,212 B2
(45) Date of Patent: May 22, 2007

(54) VIRTUAL USB CARD READER WITH PCI EXPRESS INTERFACE

(75) Inventors: Kian-Leng Lee, Taipei (TW); Wee-Kuan Gan, Taipei (TW)

(73) Assignee: Phison Electronics Corporation, Taipei (TW)

( * ) Notice: Subject to any disclaimer, the term of this patent is extended or adjusted under 35 U.S.C. 154(b) by 170 days.

(21) Appl. No.: 10/906,938

(22) Filed: Mar. 14, 2005

(65) Prior Publication Data
US 2006/0212640 A1    Sep. 21, 2006

(51) Int. Cl.
*G06F 13/00* (2006.01)

(52) U.S. Cl. .................... 710/315; 711/115

(58) Field of Classification Search .......... None
See application file for complete search history.

(56) References Cited

U.S. PATENT DOCUMENTS

| | | | |
|---|---|---|---|
| 6,941,405 B2* | 9/2005 | Morrow | 710/305 |
| 2005/0120146 A1* | 6/2005 | Chen et al. | 710/22 |
| 2005/0120157 A1* | 6/2005 | Chen et al. | 710/313 |
| 2005/0193162 A1* | 9/2005 | Chou et al. | 711/103 |
| 2005/0240713 A1* | 10/2005 | Wu et al. | 710/314 |
| 2006/0168387 A1* | 7/2006 | Gan et al. | 710/305 |
| 2006/0168391 A1* | 7/2006 | Gan et al. | 711/103 |

* cited by examiner

*Primary Examiner*—Glenn A Auve
(74) *Attorney, Agent, or Firm*—Jianq Chyun IP Office

(57) ABSTRACT

The present invention discloses a virtual universal serial bus (USB) card reader with a peripheral component interconnect (PCI) Express interface. The card reader includes a microcontroller connected to a PCI Express connecting interface and a memory card connecting interface separately. The microcontroller includes a memory card interface, a PCI Express interface and a virtual USB module. The virtual USB module includes a USB host and a USB device. If a host gives an instruction to a memory card connected to the card reader for storing or reading data, the instruction will be sent to and executed by the virtual USB module. The data in the memory card can be transmitted at a transmission rate up to the USB standard, and the host will consider the card reader as a USB device instead of simply a PCI Express device.

11 Claims, 2 Drawing Sheets

VIRTUAL USB CARD READER WITH PCI EXPRESS INTERFACE

BACKGROUND OF THE INVENTION

1. Field of the Invention

The present invention relates to a virtual universal serial bus (USB) card reader with a peripheral component interconnect (PCI) Express interface, and more particularly to a virtual USB card reader that uses the PCI Express interface as a transmission interface.

2. Description of the Related Art

As the science and technology of computers grows in a fast changing manner, a computer tends to be developed with powerful computational functions and a fast speed, and thus the clock of a central processing unit (CPU) is too fast, and the transmission rate of other peripheral equipments cannot catch up with the processing speed of the CPU at all. Even though the CPU continues enhancing its performance, the transmission rate of peripheral equipments cannot be improved much because the overall performance of a computer depends on the whole system. It is necessary to improve the whole computer architecture before the performance of a CPU can be maximized.

However, the data transmission rate depends on the transmission rate of a bus. To enhance the performance of a computer, related manufacturers usually improve the transmission rate of a bus. For example, the transmission rate of an integrated drive electronic (IDE) interface connected to a hard disk drive reaches 160 MB/s; the network line is upgraded from 10 MB/s to 1 GB/s; the transmission rate of the RS-232 is replaced by the 480 MB/s of the universal serial bus (USB), and the present PCI interface with a transmission rate of 133 MB/s upgrades the transmission rate of its lane to 250 MB/s, which becomes a new-generation peripheral component interconnect (PCI) Express interface. The PCI Express further interface supports a hot-plug control function. Therefore, the PCI Express interface is extensively accepted by users.

Further, the flash memory since its announcement gradually replaces the EEPROM or battery power memory in many portable device due to its charming features including low power consumption, non-volatility, shock resistance, and high-capacity storage. With the advanced semiconductor technologies, the storage capacity and transmission rate of a flash memory grow rapidly and the flash memory replaces traditional storage medium such as a hard disk drive in many applications. However, the present memory card made of flash memories becomes an indispensable product to the general public and the sales volume and types of memory cards are growing due to the popularity of digital cameras, PDAs, and mobile phones.

Most memory cards use a universal serial bus (USB) interface or an integrated drive electronics (IDE) interface as the transmission interface. The transmission rates of the USB or IDE interface are just 480 MB/s and 160 MB/s respectively, and such transmission rates cannot catch up with the accessing speed of the memory card. Therefore, the applications of the memories are restricted by the USB or IDE interface of the host, and its performance cannot be maximized.

Further, several environment interfaces that integrate editing, coding, debugging, file management and execution are provided in a program development system or a software program, and such environment interface enables a programmer to execute and develop most of the work required for an application program. Therefore, the software executed at the host adopts a specific environment interface and peripheral device for communications, and the peripheral devices must have the environment interface of the host before the instruction from the host can be executed.

Therefore, it is desirable to provide a card reader that eliminates the aforesaid drawbacks.

SUMMARY OF THE INVENTION

The present invention has been accomplished under the circumstances in view. Therefore, it is a primary objective of the present invention to use the PCI Express interface as a transmission interface between a host and a card reader, and the card reader has a USB module capable of communicating with the host, such that the card reader can achieve its maximum transmission rate when accessing data in a memory card through the card reader, and the card reader also has the features of a USB interface.

To achieve the foregoing objective, the card reader comprises a microcontroller, and the microcontroller is connected separately to a PCI Express connecting interface for connecting a PCI Express bus built in a host and a memory card connecting interface for connecting a memory card, and the microcontroller has a memory card interface, a PCI Express interface and a virtual USB module, such that if the host gives an instruction to a memory card connected to a card reader for storing or reading data, the instruction will be sent to the virtual USB module and the execution of the instruction will be completed by the virtual USB module. The data in the memory card connected to the card reader is processed according to the instruction, and the memory card interface or the PCI Express interface built in the microcontroller converts the data into a data format acceptable to the memory card or the PCI Express bus. The data is then sent to the host or the memory card, such that the host can give instruction to the card reader through the virtual USB module for accessing data, and the data transmission rate can meet the transmission rate of the PCI Express standard and the card reader can maximize its transmission rate without losing the features of a USB interface.

DETAILED DESCRIPTION OF THE PREFERRED EMBODIMENT

Figure 1:
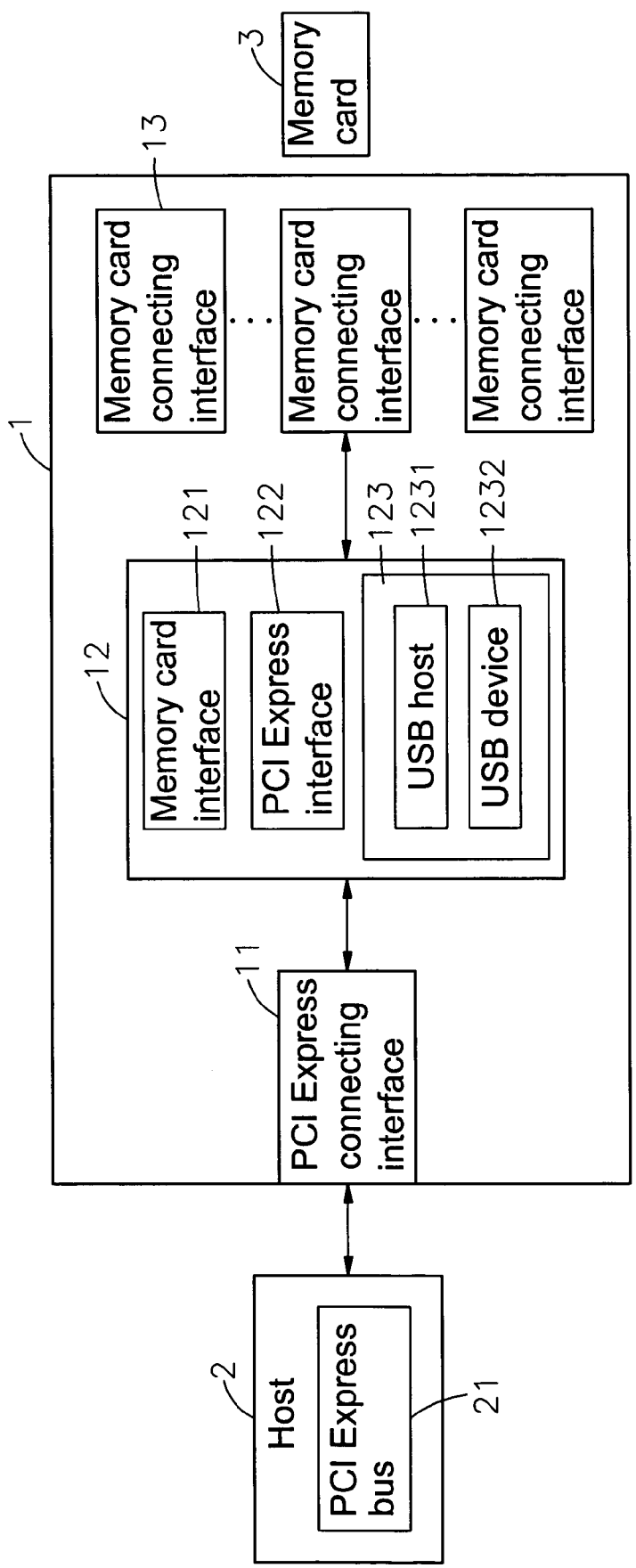
FIG. 1 is a block diagram according to a preferred embodiment of the present invention.

In FIG. 1, a card reader 1 of the present invention comprises a PCI Express connecting interface 11, a microcontroller 12 and a memory card connecting interface 13.

The PCI Express connecting interface 11 is provided for connecting to a PCI Express bus 21 built in a host 2.

The microcontroller 12 includes a memory card interface 121, a PCI Express interface 122 and a virtual USB module 123, and the virtual USB module 123 includes an USB host 1231 and an USB device 1232, and the microcontroller 12 is connected to the PCI Express connecting interface 11, and the virtual USB module 123 is not physical object, but it is virtual and simulated by a designer's firmware program.

The memory card connecting interface 13 is connected to the microcontroller 12, and the memory card connecting interface 13 is provided for connecting a memory card 3.

When the PCI Express connecting interface 11 built in the card reader 1 is connected to the PCI Express bus 21 built in the host 2, the microcontroller 12 of the card reader 1 will declare to the host 2 that the card reader 1 is a USB host, such that the host 2 will consider the microcontroller 12 as a USB host, even though the host 2 remains communicating with the microcontroller 12 by the PCI Express architecture. When the memory card 3 is connected to the memory card connecting interface 13 and the host 2 gives an instruction to the memory card 3 for storing data, the instruction will be sent to the USB host 1231 installed in the virtual USB module 123 of the microcontroller 12 first, and the USB host 1231 will sent the instruction to a USB device 1232, and the USB device 1232 will complete the execution of the instruction. At that time, the data of the host 2 will be sent to the mircocontroller 12 through the PCI Express bus 21 and the PCI Express connecting interface 11, and the memory card interface 121 built in the microcontroller 12 will convert the data into a data format acceptable by the memory card 3, and the data will be stored in the memory card 3.

Further, when the host 2 wants to read a data stored in the memory card 3, an USB instruction will be sent to the USB host 1231 built in the virtual USB module 123 of the microcontroller 12 first, and then the USB host 1231 will sent the instruction to an USB device 1232, and the USB device 1232 will complete the execution of the instruction. At that time, the memory card 3 will send the data to the microcontroller 12, and the PCI Express interface 122 built in the microcontroller 12 will convert the data into a data format acceptable by the PCI Express bus 21, and then the data will be sent to the host 2 through the PCI Express connecting interface 11 and the PCI Express bus 21.

From the description above, when the host 2 reads or stores data of the memory card 3, the data is read from or written into the memory card 3 through the microcontroller 12, and the read or write instruction is executed and completed by the USB host 1231 and the USB device 1232 built in the virtual USB module 123. Therefore, the host 2 considers the card reader 1 as an USB host with PCI Express interface.

Further, the memory card interface 121 could be a CF memory card interface, a MS memory card interface, an XD memory card interface, a SM memory card interface, a MMC memory card interface or a SD memory card interface.

Further, the quality of memory card connecting interface 13 could be one or more.

Figure 2:
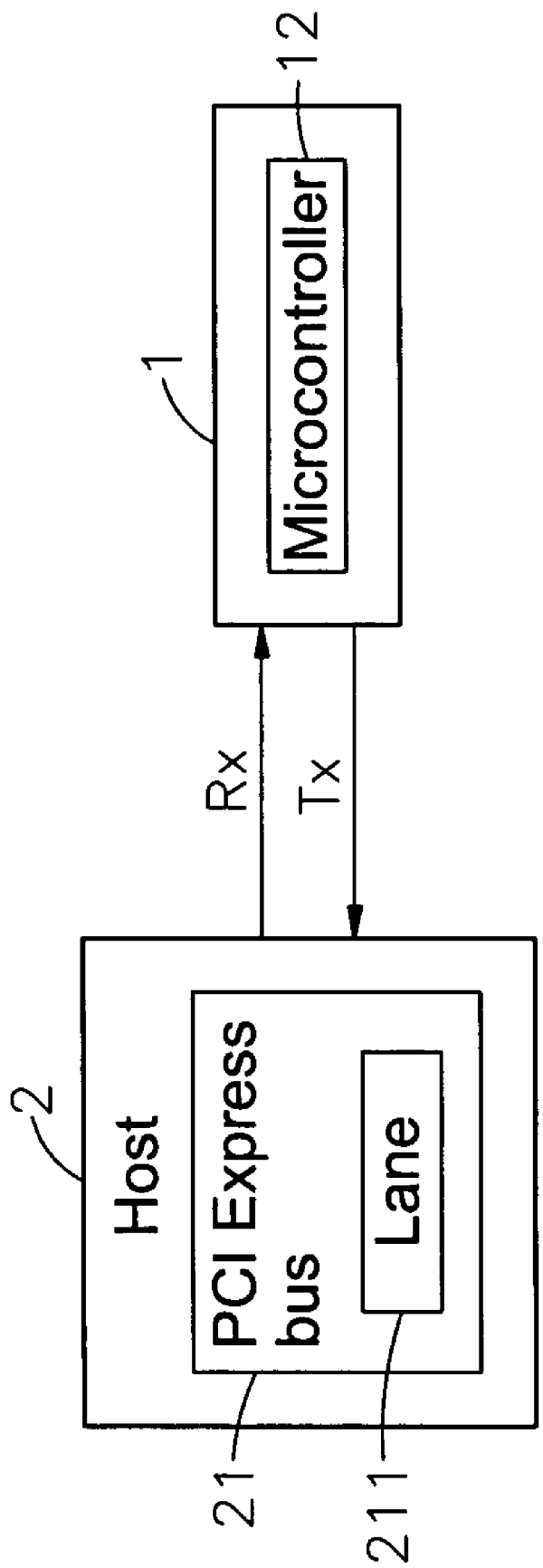
FIG. 2 is a schematic vies of transmitting data according to a preferred embodiment of the present invention.

In FIG. 2, the host 2 and the card reader 1 has a lane 211 at a physical layer for transmitting data, and the lane 211 is comprised of a transmitting end (Tx) and a receiving end (Rx), and the quantity of the lane 211 could be one or more.

Therefore, the key for the virtual USB card reader with PCI Express interface in accordance with the present invention to improve the prior arts resides on that the present invention uses a USB host and a USB device built in the card reader to execute the instruction given by the host and also uses a PCI Express interface as the transmission interface between the host and the card reader, such that the data can be transmitted at a transmission rate that can meet the PCI Express standard, and the card reader maximize its transmission rate.

A prototype of virtual USB card reader with PCI Express interface has been constructed with the features of FIGS. 1~2. The virtual USB card reader with PCI Express interface functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A virtual universal serial bus (USB) card reader with a peripheral component interconnect (PCI) Express interface, comprising:

a microcontroller, having a memory card interface for converting data into a memory card format, a PCI Express interface for converting data into a PCI Express bus format, and a virtual USB module, and said virtual USB module comprises a USB host for receiving a USB instruction given by a host and a USB device for completing the execution of said USB instruction;

a memory card connecting interface, being coupled to said microcontroller and provided for connecting a memory card;

a PCI Express connecting interface, being coupled to a PCI Express bus disposed in said host, and provided for coupling said microcontroller;

such that when said host stores or reads data into/from said memory card coupled to said memory card connecting interface, said microcontroller of said card reader will declare to said host that said card reader is a USB host, and an USB instruction given from said host will be sent to said virtual USB module and the execution of said USB instruction will be completed by said virtual USB module, and said data in said memory card coupled to said memory card connecting interface will be processed according to said USB instruction, and said data will be converted by said memory card interface or said PCI Express interface installed in said microcontroller into a data format acceptable by said memory card or said PCI Express bus, and then said data will be sent to said host or stored in said memory card.

2. The virtual USB card reader with PCI Express interface as claimed in claim 1, wherein said host and said card reader have at least one lane at a physical layer for transmitting data, and said lane comprises a transmitting end (Tx) and a receiving end (Rx).

3. The virtual USB card reader with PCI Express interface as claimed in claim 2, wherein said at least one lane comprises a plurality of lanes.

4. The virtual USB card reader with PCI Express interface as claimed in claim 1, wherein said memory card connecting interface comprises a plurality of memory card connecting interfaces.

5. The virtual USB card reader with PCI Express interface as claimed in claim 1, wherein said memory card interface is a CF memory card interface.

6. The virtual USB card reader with PCI Express interface as claimed in claim 1, wherein said memory card interface is a MS memory card interface.

7. The virtual USB card reader with PCI Express interface as claimed in claim 1, wherein said memory card interface is a XD memory card interface.

8. The virtual USB card reader with PCI Express interface as claimed in claim 1, wherein said memory card interface is a SM memory card.

9. The virtual USB card reader with PCI Express interface as claimed in claim 1, wherein said memory card interface is a SD memory card interface.

10. The virtual USB card reader with PCI Express interface as claimed in claim 1, wherein said memory card interface is a MMC memory card interface.

11. The virtual USB card reader with PCI Express interface as claimed in claim 1, wherein said virtual USB module is not a physical object, but a virtual object created by a designer through a firmware program.

* * * * *